Nov. 8, 1966  J. MULLER  3,283,903
FILTERING EQUIPMENT FOR FLUIDS
Filed Feb. 18, 1964  5 Sheets-Sheet 2

INVENTOR
JACQUES MULLER

Nov. 8, 1966 J. MULLER 3,283,903
FILTERING EQUIPMENT FOR FLUIDS
Filed Feb. 18, 1964 5 Sheets-Sheet 3

INVENTOR.
JACQUES MULLER
BY
Dean, Fairbank & Hirsch
ATTORNEYS

Nov. 8, 1966  J. MULLER  3,283,903
FILTERING EQUIPMENT FOR FLUIDS

Filed Feb. 18, 1964  5 Sheets-Sheet 4

INVENTOR.
JACQUES MULLER
BY
Dean, Fairbank & Hirsch
ATTORNEYS

Nov. 8, 1966 J. MULLER 3,283,903
FILTERING EQUIPMENT FOR FLUIDS
Filed Feb. 18, 1964 5 Sheets-Sheet 5
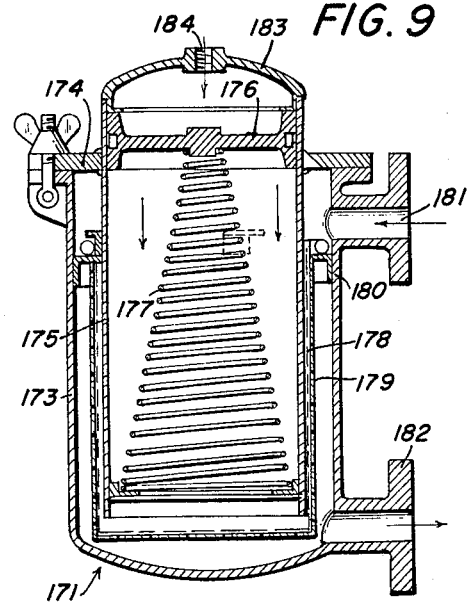
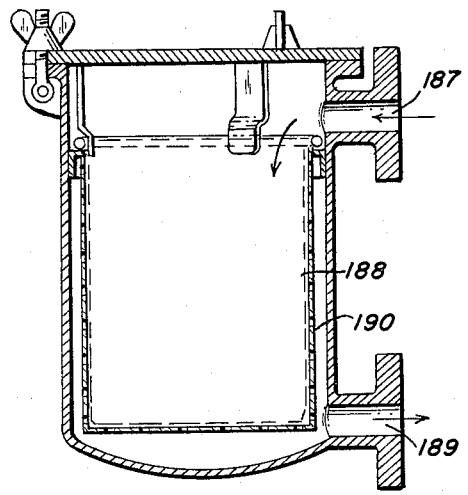
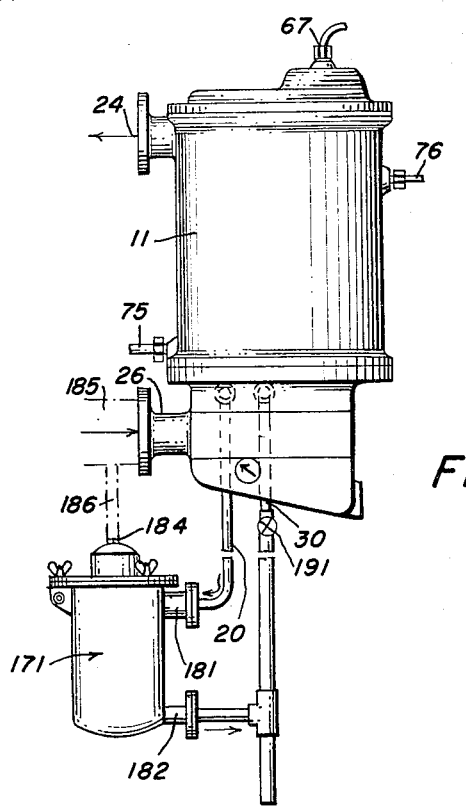
INVENTOR
JACQUES MULLER

United States Patent Office 3,283,903
Patented Nov. 8, 1966

3,283,903
FILTERING EQUIPMENT FOR FLUIDS
Jacques Muller, La Garenne-Colombes, France, assignor to Rellumit Inter, S.a.r.L., La Garenne-Colombes, France, a corporation of France
Filed Feb. 18, 1964, Ser. No. 345,653
Claims priority, application France, Mar. 4, 1963, 926,651
13 Claims. (Cl. 210—108)

This invention relates to the art of filtering equipment, more particularly of the type having self-contained automatic cleaning means for the filters incorporated therein.

As conductive to an understanding of the invention it is noted that where fluid filters or separators are used of the type for example, shows in co-pending application Serial No. 287,346, filed June 12, 1963 and now Patent No. 3,214,368 in which the filter device consists of a stack of grooved discs or washers through which the fluid is passed; where the sediment or particles in the fluid (hereinafter generally referred to as particles) during use of the filter, clogs the grooves or passageways of the stack of washers so that no further fluid can pass therethrough, if the equipment must thereupon be disassembled and the filters removed for cleaning, such procedure is extremely time consuming and reduces the efficiency of the equipment.

It is accordingly among the objects of the invention to provide a filtering or separating equipment with self-contained cleaning means, whereby the filters incorporated in the unit may rapidly and automatically be cleaned without disassembly of the device and without interrupting the normal filtering operation of the equipment thereby increasing the efficiency of the equipment and avoiding the need for skilled mechanics to disassemble and clean the unit.

According to the invention, these objects are accomplished by the arrangement and combination of elements hereinafter described and more particularly recited in the claims.

Figures 1, 2:
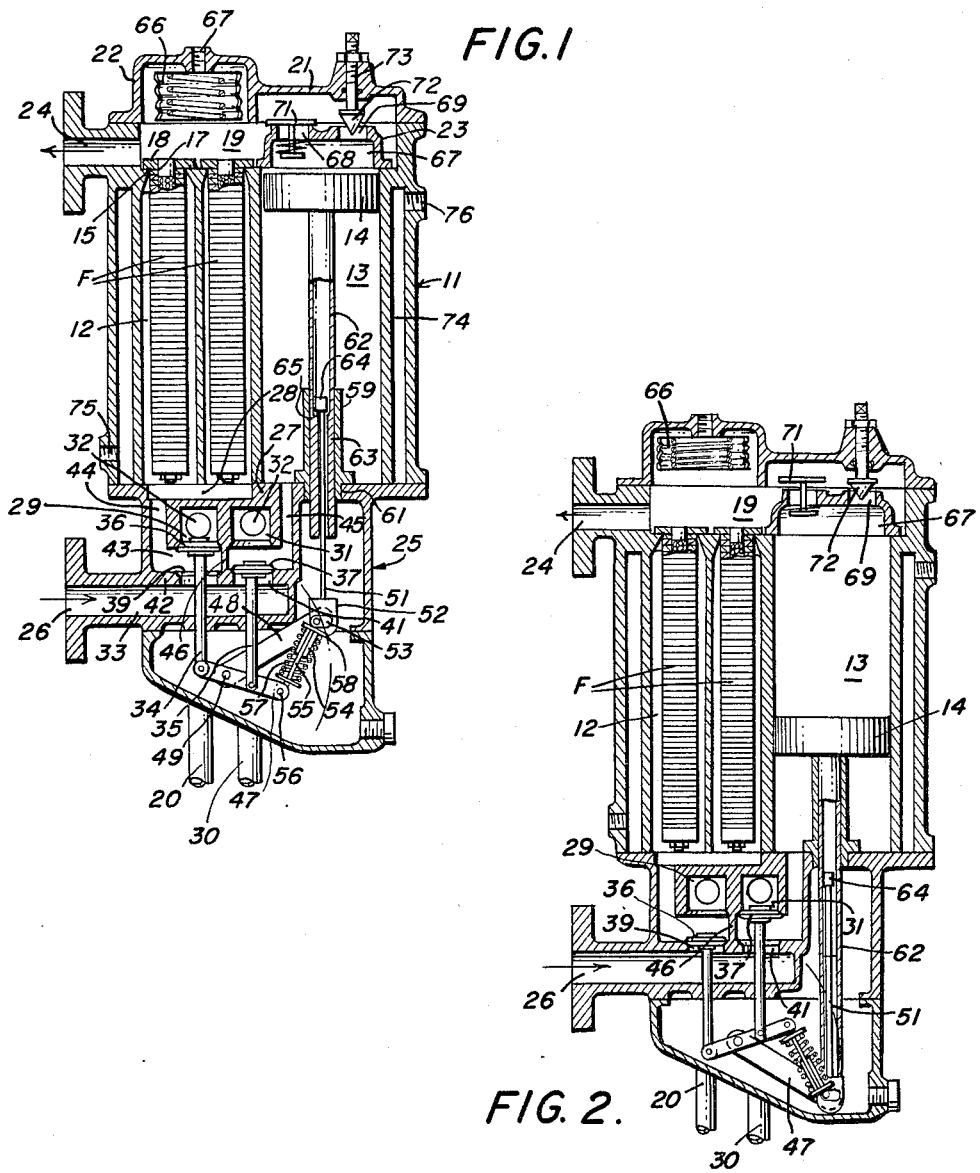
Figure 3:
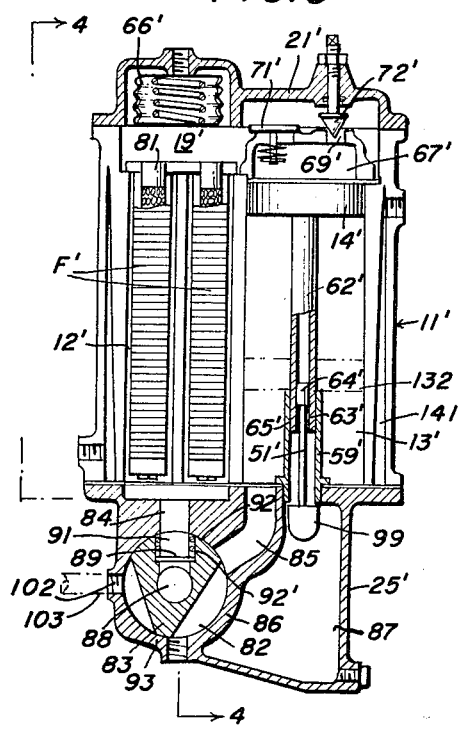
Figure 4:
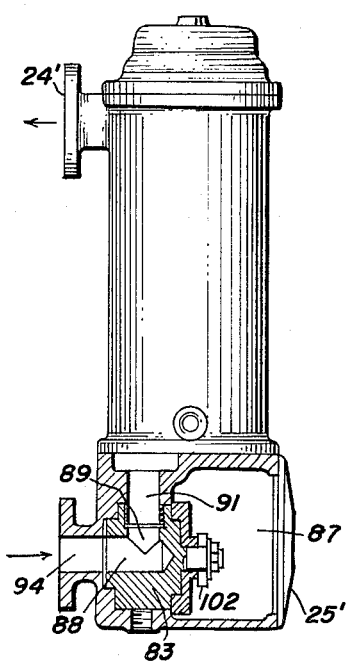
Figure 6:
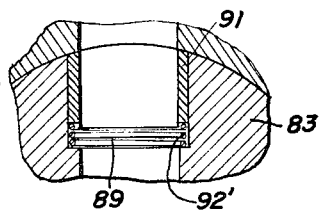
Figure 7:
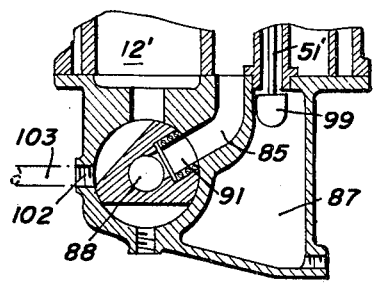
Figure 5:
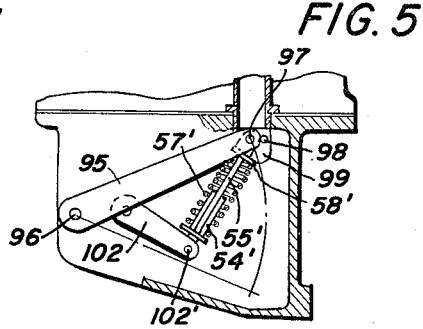
Figure 8:
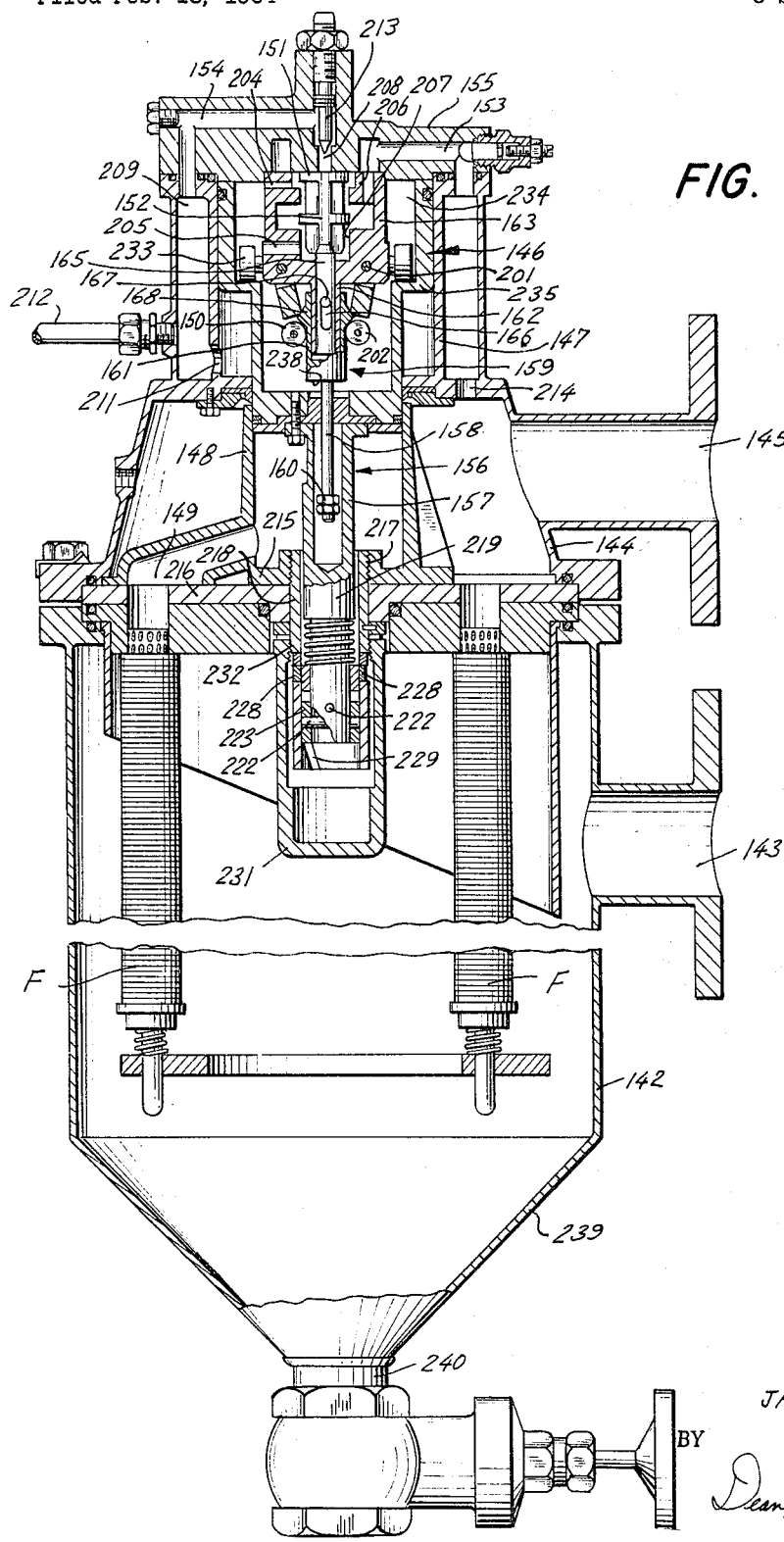
Figure 8A:
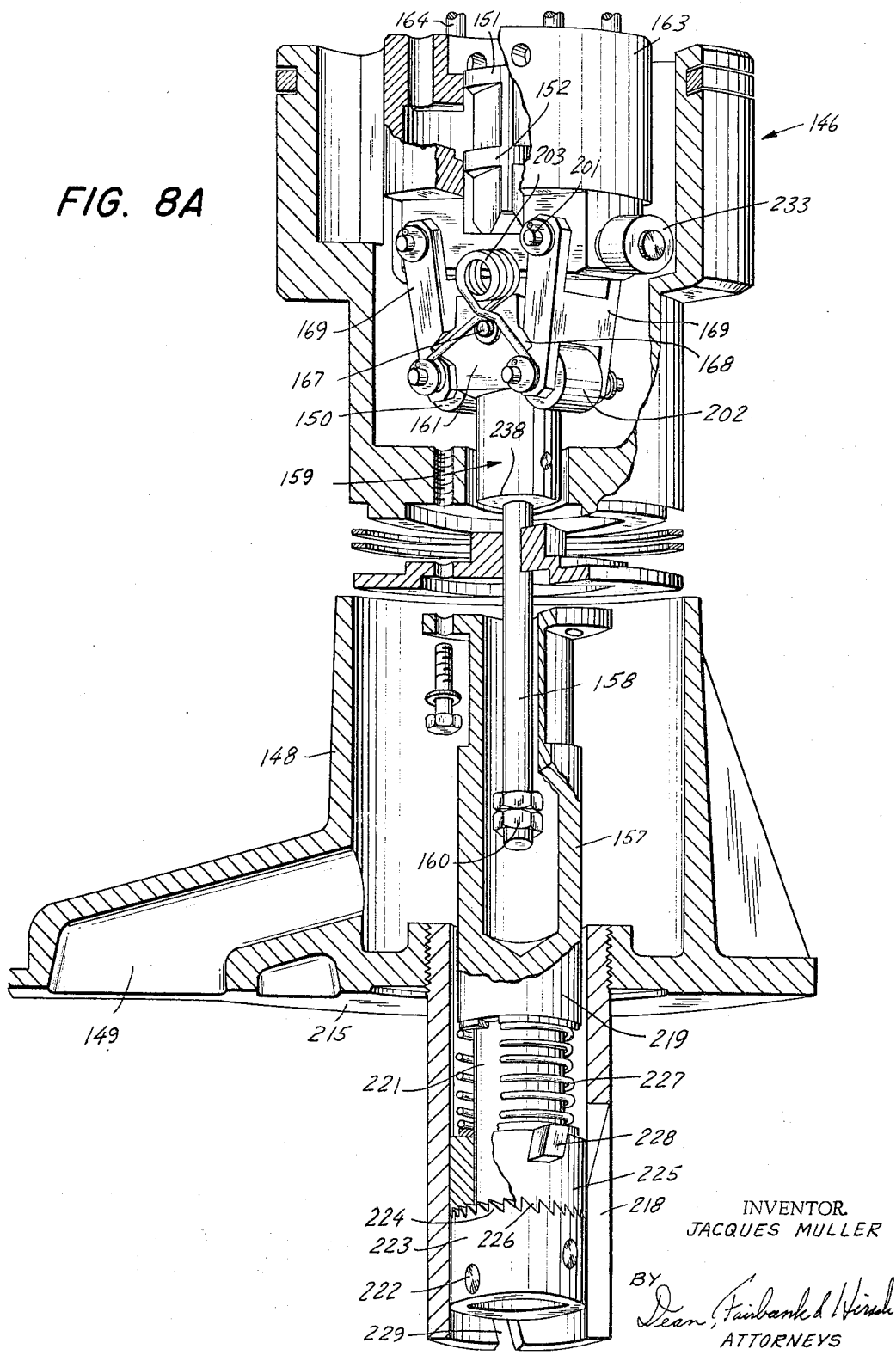

In the accompanying drawings in which are shown one or more of various possible embodiments of the several features of the invention, FIG. 1 is a longitudinal sectional view of one embodiment of the equipment during normal filtering operation, FIG. 2 is a view similar to FIG. 1 showing the equipment during a cleaning cycle, FIG. 3 is a view similar to FIG. 1 of another embodiment of the invention during normal filtering operation, FIG. 4 is a view partly in section taken along line 4—4 of FIG. 3, FIG. 5 is a view of the valve toggle mechanism of the embodiment of FIG. 3, FIG. 6 is a detail view on an enlarged scale of the valve sealing sleeve, FIG. 7 is a fragmentary view similar to FIG. 3 showing the valve member in filter cleaning position, FIG. 8 is a longitudinal sectional view of another embodiment of the invention, FIG. 8A is a perspective view of a portion of the embodiment of FIG. 8, FIG. 9 is a longitudinal sectional view of a pressure container for receiving impurities, FIG. 10 is a longitudinal sectional view of a gravity container for receiving impurities, and FIG. 11 is a filter system combining the embodiments of FIGS. 1, 2 and 9.

Referring now to FIGS. 1 and 2 of the drawings, the filter equipment comprises a casing 11 having two chambers 12 and 13, the latter being cylindrical in order slidably to mount a piston 14. The chamber 12 has a top wall 15 with a plurality of openings therethrough and a corresponding plurality of filter colums F are positioned in said chamber 12.

Each of the filter columns F comprises a stack of filter members, illustratively discs or washers having relatively small cross section grooves in the surface thereof with increasing section from the outside to the inside and mounted in superposed relation in a central perforated tube 17. It is of course understood that other types of filter elements could be used, but in the illustrative embodiment of the invention herein shown, a filter of the type shown in application Serial No. 287,346 is utilized.

As illustratively shown, each of the filter columns F is supported in an associated opening in top wall 15 by means of the outstanding lateral flange 18 on the upper end of the associated tube 17 so as to depend vertically in chamber 12, fluid entering the chamber 12 passing from the outer surface of each of said columns F through the grooves in each of said superimposed washers which restricts or restrains passage of particles, then passing upwardly through the bore of perforated tube 17 of each of the columns through the associated opening in the top wall 15 to the upper portion of the casing 11.

As shown in FIGS. 1 and 2, the casing 11 has a chamber 19 at its upper end in communication with the bores of filter columns F and closed by means of a cover plate 21 which has a cylindrical portion 22 axially aligned with the chamber 12.

The chamber 19 is also in communication with the upper end of cylindrical chamber 13, which upper end has an inverted cup-shaped cover member 23 secured thereto, an outlet port 24 leading into said chamber 19.

The lower end of casing 11 has a cup-shaped closure casing 25 secured thereto which has an inlet port 26 for the unfiltered fluid.

The casing 25 has a top wall 27 with a recess 28 in alignment with the lower end of chamber 12 and a pair of cavities 29, 31 are provided beneath the floor of said recess 28, said cavities having outlets 32 to which pipes 20, 30 respectively are connected.

The inlet port 26 leads into a transverse chamber 33 positioned in casing 25, said chamber having vertically aligned openings which slidingly support parallel valve stems 34 and 35, each of which mounts a valve head 36, 37 at its upper end, said valve heads controlling the lower ends of cavities 29, 31 and the enlarged openings 39, 41 in the upper wall 42 of the chamber 33.

The upper wall 42 of chamber 33 defines the floor of a chamber 43 in casing 25, said chamber 43 being connected to chamber 12 and chamber 13 respectively by passageways 44 and 45, a partition 46 in chamber 43 preventing communication between chambers 12 and 13.

The lower ends of said rods 34, 35 are pivotally connected to a link 47 and a second link 48 is pivotally connected at one end as at 49 to link 47 midway between rods 34 and 35 and at its other end to the lower end of a vertical rod 51.

The rod 51 has a plate 52 at its lower end with an elongated horizontal slot 53 in which said free end of link 48 is pivotally connected. In addition, a sleeve 54 is pivotally connected at one end in said slot and slidably mounts a pin 55 which is pivotally connected at its free end to the end of link 47 as at 56.

A compression spring 57 encompasses sleeve 54 and pin 55 and reacts against collars 58 secured to sleeve 54 and pin 55 as shown in FIGS. 1 and 2.

As a result, with downward movement of rod 51, the valve stems 34, 35 will snap from the position shown in FIG. 1 in which cavity 29 and opening 41 are closed to the position shown in FIG. 2 in which cavity 31 and opening 39 are closed.

The pin 51 extends through a vertical sleeve 59 axially aligned with chamber 13 and extending through an opening 61 in floor 27. Slidably mounted in sleeve 59 is the lower end of a hollow piston rod 62 secured at its upper end to piston 14, said piston rod having a reduced diameter portion 63 at its lower end through which pin 51 extends, the latter having a head 64 at its free end adapted to abut against the shoulder 65 defined by said reduced diameter portion 63.

Positioned in the cylindrical portion 22 of cover 21 is a pressure compensating device, such as a bellows 66 spring urged to extended position as shown in FIG. 1 and having a vent opening 67.

The cup-shaped cover member 23 defines a chamber 67 above the piston 14 and the top wall of said cover 23 has openings 68, 69, the former being normally closed by a spring urged valve 71 and the opening 69 being controlled by a manually operated throttle valve 72, which has a threaded stem 73 extending through a correspondingly threaded opening in the wall 21 to adjust the flow of purified fluid into chamber 67.

The casing 11 also includes an annular jacket 74 through which fluid may be circulated by means of ports 75, 76 to permit a heat exchange depending upon the type of fluid to be purified.

In the operation of the unit shown in FIGS. 1 and 2, the fluid to be purified is forced under pressure through port 26 (FIG. 1) and in normal operation flows through opening 39 and passageway 44 into chamber 12, the cavity 29 being closed at such time by valve 36. At this time, the valve 37 has closed opening 41 and cavity 31 is open providing a passage for the unpurified fluid contained in chamber 13 beneath piston 14, through line 30 which is connected to the tank containing the fluid to be purified.

The fluid under pressure passing into chamber 12 will flow from the outer surface of each of the filter columns F through the grooves in each of the superimposed washers which restrict or restrain passage of particles, then passes upwardly through the perforated tube 17 into chamber 19 to be discharged through outlet 24.

As a result of the pressure in chamber 19, a certain amount of purified fluid will also pass through opening 69, the amount being determined by the setting of valve 72, and enter the chamber 67 above piston 14, thereby causing the piston to move downwardly. As the piston moves downwardly, the lower end of the piston rod 62 will abut against the plate 52 thereby effecting a toggle action which will cause the spring 57 rapidly to pivot the link 47 to reverse the position of stems 34, 35, so that valve 36 closes opening 39 and opens cavity 29 and valve 37 closes cavity 31 and opens opening 41.

As a result, the unpurified fluid will now pass through opening 41 and passageway 45 into chamber 13 beneath piston 14 causing the latter to move upwardly. As a result, the purified fluid in chamber 67 on top of the piston 14 will be forced through valve 71 which will open, and into chamber 19 to be discharged through port 24. In addition, such purified fluid will also be forced through the perforated tubes 17 of the filter columns F and thence laterally outward through the grooves of the filter washers to discharge impurities lodged in the grooves and forcing such impurities downwardly through passageway 44 into cavity 29 and through line 20 into a suitable container for the impurities.

As the cleaning operation continues, the piston 14 will gradually rise until the shoulder 65 abuts against head 64 of pin 51 causing said pin 51 to rise and as a result of the toggle action will rapidly reverse the position of stems 34, 35 so that the valve heads 36, 37 will be restored to the position shown in FIG. 1 so that normal action of the unit is restored.

It is apparent from the foregoing that there will be continuous flow of purified fluid through outlet 24 even during the reverse flow through the filter columns F and that the cleaning action will occur periodically and automatically without need for stopping the operation of the equipment in any manner.

The embodiment shown in FIGS. 3 to 7 is similar in many respects to the embodiment shown in FIGS. 1 and 2 and corresponding parts have the same reference numerals primed.

Referring to FIGS. 3 to 7, the equipment comprises a casing 11' having two chambers 12', 13', the latter being cylindrical in order slidably to mount a piston 14'. The chamber 12' has a plurality of filter columns F' positioned therein of the type described with respect to the embodiment of FIGS. 1 and 2, the open upper ends of the bores 81 of each column leading into a chamber 19' in the casing defined by a cover plate 21' positioned over the upper end of said casing.

The lower end of casing 11' has a casing 25' mounted thereon which has a cylindrical bore 82 in which a valve member 83 is positioned, a passageway 84 leading from the lower end of chamber 12' into said bore 82. In addition, a second passageway 85 leads from said bore 82 into the lower end of chamber 13' and a partition or wall 86 in casing 25' defines a chamber 87.

The valve member 83 which is rotatably mounted in said bore 82 has a central axial passageway 88 in communication with a radical passageway 89 and a sleeve 91 is slidably mounted in said passageway 89 and urged by a spring 92' into engagement with the wall of bore 82 to provide a dependable seal.

The valve member 83, as shown in FIG. 3, is substantially in the form of an isosceles triangle in cross section having a rounded base 92 and apex 93 which ride against the wall of bore 82.

As shown in FIG. 4, the casing 25' has an inlet port 94 in communication with the axial bore 88 of valve member 83 and through which unpurified fluid under pressure is forced.

The valve member 83 is controlled by a toggle mechanism similar to the one shown in FIGS. 1 and 2. Thus a lever 95 is pivotally mounted at one end as at 96 to the wall of casing 25' and at its other end as at 97 in an elongated slot 98 in a plate 99 secured to the lower end of vertical rod 51'. The rod 51' is positioned in a vertical sleeve 59' rising from wall 101 at the lower end of chamber 13' and extends through the reduced diameter lower portion 63' of a hollow piston rod 62' to the upper end of which piston 14' is mounted. The reduced diameter portion 63' defines a shoulder 65' against which abuts a head 64' secured to the upper end of rod 51'.

A lever 102 is pivotally connected at one end to valve member 83 and its other end is pivotally connected to one end of a sleeve 54' in which a pin 55' is slidably mounted, the free end of said pin 55' being pivotally mounted in said horizontal slot 98 in plate 99.

A compression spring 57' encompassing the pin 55' and sleeve 54' is compressed between collars 58' secured to the pin and sleeve respectively.

The bore 82 has a port 102 in communication therewith, connected by line 103 to a container for the impurities to be discharged.

In normal operation of the equipment, the unpurified fluid flows under pressure through passage 94 then through the axial bore 88 of valve member 83 which is in the position shown in FIGS. 3 and 4 and then through passageways 89 and 84 into the chamber 12'.

As previously described, with respect to the embodiment of FIGS. 1 and 2, the fluid under pressure passing into chamber 12' will flow from the outer surface of each of the filter columns F', through the grooves in each of the superimposed washers which restrict or restrain passage of particles and then pass upwardly through the bores 81 of the filter columns F into chamber 19' to be discharged through outlet 24'.

As a result of the pressure in chamber 19' a certain amount of fluid will also pass through opening 69' controlled by valve 72' and enter the chamber 67' above piston 14, thereby causing the piston to move downwardly. As the piston moves downwardly and the lower end of piston rod 62' abuts against plate 99 it will pivot lever 95 and sleeve 54' with its pin 55', in a clockwise direction compressing spring 57'. When the pivot 97 has passed the pivot 102', the compressed spring 57' will force lever 102 in a counterclockwise direction thereby quickly rotating valve member 83 from the position shown in FIG. 3 to the position shown in FIG. 7.

As a result, the inlet port 94 will now be connected to passageway 85 leading into the lower end of chamber 13' and chamber 12' will be connected to port 102 as shown in FIG. 7.

Consequently, as previously described, the piston 14' will be moved upwardly, forcing the purified fluid through outlet port 24' and also in reverse direction through the filter columns F' to clean the latter, the impurities being forced downwardly through outlet 102 and line 103 into the collecting container therefor.

When the piston reaches its upper position, the shoulder 65' of piston rod 62' will abut against head 64' and cause the toggle mechanism previously described to again rotate the valve member 83 to its normal position shown in FIG. 3 whereupon the fluid will be purified as previously described.

The bellows 66' serves to compensate for loss of pressure which would serve to slow down the rate of flow of the purified fluid through oulet port 24' upon change of position of valve member 83.

The embodiment shown in FIGS. 8 and 8a also relates to a continously operating filter apparatus, but in this embodiment the filter columns are cleaned one after the other.

As shown in FIG. 8, the filter unit comprises a lower housing 142 having an inlet port 143 for introduction of the fluid under pressure to be purified. In this housing there are arranged a plurality of vertical filter columns F of the type previously described, circumferentially spaced as shown, the bores of the columns leading into an upper housing 144 containing the automatic cleaning device. A port 145 provides for outlet of the purified liquid towards the use circuit.

The automatic cleaning device comprises a differential or stepped piston 146 which is slidable in a cylinder having two parts 147 and 148 of different volume, positioned in upper housing 144, the part 148 being rotatable to serve as a rotary distributor for a given quantity of purified liquid intended for the cleaning of a filter column, a port 149 being provided for this purpose.

In the piston 146, there is housed a cam system associated with two superimposed ganged valves 151 and 152 capable of assuming two different positions in order to reverse the direction of movement of the piston.

The piston 146 has a rod 156 secured to the bottom surface thereof and extending axially therefrom. The upper portion 157 of rod 156 is hollow to receive the reduced threaded end 158 of a stem 159 which extends through the bottom of the piston 146 and has nuts 160 secured thereto. The enlarged upper portion 161 of the stem 159 is hollow, slidingly to receive the hollow axial sleeve 162 depending from a valve body 163 secured by bolts 164 to the upper part 155 of the unit. The sleeve 162 slidingly mounts the stem 165 of ganged valve members 151, 162 and said stem has a vertical slot 166 through which extends a pin 167 that also extends through an elongated slot in the axial sleeve 162 of valve body 163 and a circular hole in the enlarged upper portion 161 of stem 159.

The enlarged upper portion 161 of stem 159 has two outwardly extending opposed triangular cam surfaces 168 and a pair of yokes 169 are provided, pivoted at one end as at 201 to the bottom of valve body 163 and mounting rollers 202 at their free ends, the yokes being resiliently urged together by a torsion spring 203 to retain the rollers against the cams 168 as shown.

The valve body 163 which is positioned in the piston 146, has a pair of vertically spaced transverse passageways 204, 205 associated with vertically spaced valve seats 206, 207 designed to receive the valves 151, 152. In addition, the upper part 155 has a vertical bore 208 in communication with passageway 154 leading into annular chamber 209 in upper housing 144, said chamber being in communication with the interior of the upper part 147 of the piston cylinder through port 211 and having an outlet port 212. The vertical bore 208 is controlled by valve 151 and a needle valve 213 controls flow between passageway 154 and bore 208.

The chamber 209 which is in communication with the interior of housing 144 through port 214 also is in communication with passageway 153 that leads into the valve body 163.

The lower portion 215 of cylindrical portion 148 is seated against a plate 216 clamped between the lower and upper housings 142, 144 and is in rotatable sealing engagement with respect thereto.

The port 149 leading into the lower portion 148 is adapted to be successively aligned with the upper end of each of the filter columns as shown.

The lower portion 215 has an axial opening 217 in which is secured one end of a vertical sleeve 218 in which extends the lower end 219 of rod 156.

As is clearly shown in FIGS. 8 and 8A, such lower end 219 has a reduced diameter portion 221 to the extremity of which is secured by pins 222 a collar 223 which has ratchet teeth 224 on the upper edge thereof. Encompassing the reduced portion above the collar 223 is a drive collar 225 which has ratchet teeth 226 on the lower edge thereof resiliently urged against teeth 224 by a coil spring 227.

The drive collar 225 has two opposed outwardly extending inclined cams 228 which ride in helical slots 229 in vertical sleeve 218.

As shown in FIG. 8, a sleeve 231 closed at one end encompasses the lower portion of sleeve 218 and is secured at its upper end as at 232 to said sleeve 218.

To restrain rotation of the piston 146, the valve body 163 has two outwardly extending rollers 233 which ride in vertical grooves 234 in the inner surface of the piston.

In the operation of the embodiments of FIGS. 8 and 8A, with valves 151 and 152 in the position shown and with passageway 154 closed by valve 151, the unpurified fluid flows under pressure through the port 143 to be purified by the filtering columns F in the manner previously described and then emerges through the port 145 towards the place of use, but leaving a certain amount of purified fluid to flow through the passageway 153 and open valves 151, 152 and passageways 204, 205 to the interior of the piston to actuate the latter.

As can be seen from FIG. 8, when the piston 146 is in its top position, the valves 151 and 152 allow the driving fluid to pass into the interior of said piston 146 through passageways 204, 205 so as to cause the piston 146 to descend to expel the purified fluid contained in the distributing cylinder 148 through port 149 in order to effect reverse flow of such purified fluid through the filtering column which is immediately below the port 149.

As the piston 146 moves downwardly, the rod 156 will also move downwardly and as the cams 228 are in the helical slots 229 in sleeve 218, the drive collar 225 will rotate as it moves downwardly with the rod 156, the teeth 226 on the lower edge of the drive collar 225 ratcheting over the teeth 224 of collar 223.

Toward the end of the downward stroke of the piston, the bottom of the latter will abut against nuts 160 causing the stem 159 to move downwardly. As this occurs, the cams 168 will move the spring urged rollers 202 outwardly and when they ride over the apices of the cams 168 they will snap the stem 159 downwardly so that the pin 167 which has moved downwardly in slot 166 in valve stem 165 without moving the valves 151, 152, will now react against the lower edge of the slot 166, quickly moving valves 151, 152 downwardly to close passageways 204, 205 and open passageway 154.

As a result, no more fluid will flow into the interior of the piston 146 and as no pressure is now exerted to move the piston downwardly, the pressure in chamber 148 due to the flow through the filtering columns F associated therewith will react against the bottom of the piston to cause the latter to rise. As a result, the fluid in piston 146 will be under pressure and hence will flow in reverse direction through passageways 204 and 154, port 211 into cylinder 147 to react against shoulder 235 of the piston, also moving it upwardly, the balance of the fluid in cylinder 147 flowing through port 212 to the use circuit.

As the piston 146 rises, the rod 156 secured to the lower end thereof also will rise so that the teeth 224 on lower collar 223 will now engage the teeth 226 on drive collar 225. By reason of the reaction of the cams 228 carried by collar 225 against the helical slots 229 in sleeve 218, the latter will rotate the lower cylinder part 148 to align the port 149 with the next successive filter column. By setting the position of the needle valve 213, the rate of flow can be set and hence the speed of rotation of cylinder 148.

As the piston approaches the upper end of its stroke, the inner surface of the bottom thereof will abut against the shoulder 238 of stem 159 causing the latter to move upwardly. As a result, the pin 167 will initially ride upwardly in slot 166 without moving the valve stem 165. However, the cams 168 will move upwardly forcing the rollers 202 outwardly and when the rollers ride downwardly over the apices of the cams 168, they will snap the cams and stem 159 upwardly so that pin 167 will abut against the upper end of slot 166 to move the valves 151, 152 to the position shown, to reverse the cycle.

The impurities, resulting from each cleaning, are collected in the lower cone 239 of the housing 142 from where they are discharged into a suitable container through an orifice 240.

Such container for the impurities may be of the pressure type (FIG. 9) or of the gravity type (FIG. 10).

FIG. 11 shows by way of example a pressure container of the type shown in FIG. 9 connected by conduits 20 and 30 to a filtering equipment of the type shown in FIGS. 1 and 2. This container comprises a housing 173 (FIG. 9) closed by a removable cover 174 rigidly connected with an open end cylinder 175 in which there can freely move a piston 176 under which there is arranged a spring 177 intended to return it into its upper portion. An interchangeable porous bag 178 of cotton cloth or the like is arranged on the outer part of the cylinder 175 between the latter and a removable protective perforated basket 179 maintained by its edge 180 in the housing 173. A port 181 is connected to the line 20 of the filtering equipment, while the port 182 is in communication with the line 30, the latter being extended towards the tank for the unpurified fluid (not shown).

The cylinder 175 is closed by a cover 183 provided with a port 184 connected to the conduit 185 for the flow of the unpurified liquid through line 186.

When the cleaning of the filtering columns is effected under the thrust of the piston 14 of the filtering apparatus (FIG. 2), the impurities are moved under pressure through the line 20 toward the port 181 of the container 173 to flow into the bag 178 between cylinder 175 and basket 179 and be collected by the bag 178 while the unpurified fluid emerges through the port 182 and moves towards the tank with the fluid contained below the piston 14 of the filtering apparatus (FIG. 1). At this moment under the pressure of the spring 177, the piston 176 of the container 173 is in its upper position.

During descent of the piston 14 of the filtering apparatus, the valve 36 closes the conduit 20 and the pressure of the unpurified fluid coming from the conduit 185 through port 184 pushes the piston 176, which has the effect of expelling the fluid contained in the cylinder 175 and moves it towards the tank via the port 182, leaving a large part of its impurities in the bag. The cycle then starts again.

A regulating cock 191 (FIG. 11) is desirably arranged in the line 30 in order to vary, as desired, the cycle of the filtering apparatus.

In a simplified variant of the impurities container, shown in FIG. 10, which is arranged to operate by gravity, the inlet of the unpurified fluid containing the residues of the cleaning flow through the port 187 to be filtered partially through the bag 188 and to return via the port 189 to the tank. A perforated basket 190 further assures the protection of the bag 188 against expansion.

If desired, the piston device of the impurities container of the pressure type can be replaced by a suitable bladder which is inflatable and deflatable under the pressure of the unpurified fluid, or with an auxiliary fluid such as compressed air, for example.

With the equipment above described, effective cleaning of the filter columns may be accomplished automatically during operation of the unit without stoppage of the filtering or purification action of the device thereby eliminating need for stoppage of the equipment and replacement of the filter columns.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for filtering impurities from fluids comprising a casing having an inlet port for unfiltered fluids and an outlet port for filtered fluids, filter means in said casing through which fluid may flow from said inlet port to said outlet port, for filtering of such fluid, said filter means having a fluid port at its upper end, a chamber in said casing positioned above said filter means in communication with the fluid port thereof, said outlet port being in communication with said chamber, an actuating cylinder having a piston slidable therein, means providing communication between one side of said piston and said chamber, valve means associated with the inlet port and movable between two positions, one of said positions providing communication between said inlet port and said casing for flow of unfiltered fluid through said filter means, and the other position providing communication between said inlet port and the other side of said piston, and means controlled by movement of said piston in said cylinder between the ends thereof to effect successive movement of said valve means between its two positions, whereby when said piston is moved toward said chamber when said inlet port is connected to said other side of said piston a portion of the filtered fluid in said chamber above said piston will be forced through said outlet port and another portion thereof will be forced into the fluid port of said filter means for flow through the filter means in reverse direction to clean the filter means.

2. The combination set forth in claim 1 in which a pressure compensation device is provided in said chamber, said device normally being resiliently distended and compressed by the filtered fluid under pressure forced into said chamber, whereby upon drop of pressure in said chamber the compensating device will expand to compensate for such drop.

3. The combination set forth in claim 2 in which said device comprises a bellows having an internal spring urging the bellows to extended position and means are provided to vent said bellows.

4. The combination set forth in claim 1 in which the upper end of said actuating cylinder has a cover plate, and an opening is provided in said cover plate, an adjustable flow control valve being associated with said opening to regulate the flow between said chamber and said cylinder.

5. The combination set forth in claim 1 in which the upper end of said actuating cylinder has a cover plate and a pair of openings are provided in said cover plate, one of said openings having a one-way valve associated therewith which permits flow therethrough only from said cylinder into said chamber.

6. The combinatiton set forth in claim 5 in which means are provided to control the flow through the other opening.

7. The combination set forth in claim 1 in which passageways are provided from said inlet port to said casing and to the lower end of said cylinder respectively, a discharge port is associated with each of said passageways, said valve means comprises a pair of valves which alternately connect said inlet to the passageway leading into the casing and close the associated discharge port, and connect said other discharge port to the other passageway and cut off communication between said other passageway to said cylinder and vice versa in the two positions of said valve means.

8. The combination set forth in claim 1 in which passageways are provided from said outlet port to said casing and to the lower end of said cylinder respectively, a discharge port is associated with each of said passageways, said valve means comprises a pair of valves which alternately connect said inlet to the passageway leading into the casing and close the associated discharge port to the other passageway and cut off communication between said other passageway to said cylinder and vice versa in the two positions of said valve means, said valve means each comprises a valve head having a stem, and toggle linkage is operatively connected between said stems and said piston to move the vale heads between their two positions with movement of said piston between its extreme positions in said cylinder.

9. The combination set forth in claim 1 in which said casing has a rotary valve member associated therewith, said valve member having an axial passageway in communication with said inlet port, and a radial passageway leading into said axial passageway, a housing having a bore for said rotary valve member, said bore having a passageway leading thereinto in communication with the lower end of said actuating cylinder and two discharge ports, said valve member being movable between two positions, alternatively in one of said positions to connect said inlet port to the filter means casing through the axial passageway and radial bore in said valve member and connect said passageway to one of the discharge ports and in the other position to connect said inlet port to the passageway through said axial passageway and radial bore in said valve member and connect said filter means casing to the other discharge port.

10. The combination set forth in claim 9 in which a toggle linkage is operatively connected between said valve member and said piston to move the valve member between its two positions with movement of said piston between its extreme positions in said cylinder.

11. Equipment for filtering impurities from fluid comprising a casing having an inlet port for unfiltered fluids and an outlet port for filtered fluids, a plurality of vertical filter columns circumferentially spaced in said casing each column having a fluid port at is upper end, fluid normally flowing from said inlet port through said columns and out of said fluid port, a cylinder having an upper and lower portion, the lower portion being rotatably mounted with respect to the upper portion and of smaller diameter, a piston slidably mounted in said cylinder and also having an upper and lower portion in the respective portions of the cylinder and of corresponding diameter, means rotatably mounting said lower portion of the cylinder for successive communication between the fluid port of one of said filter columns and said lower portion, said outlet port being in communication with the fluid ports of said other columns, passageways leading from said outlet port to the interior of said piston and to the exterior thereof, valve means alternately to open and close said passageways, whereby when filtered fluid is applied to the interior of said piston it will move the latter downwardly to force filtered fluid in reverse direction through the filter column in communication with the lower portion of the cylinder, thereby cleaning said filter column, and means controlled by upward movement of said piston to rotate said lower portion of the cylinder to align another filter column with such lower portion.

12. The combination set forth in claim 11 in which a toggle action mechanism is provided to rotate said lower portion of the cylinder upon movement of the piston to its lowermost position.

13. Equipment for filtering impurities from fluids, comprising a casing having an inlet port for unfiltered fluids, and an outlet port for filtered fluid, filter means in said casing through which fluid may pass from said inlet port to said outlet port for filtering of said fluid, a chamber in said casing into which at least a portion of the filtered fluid will flow, means periodically to force a portion of the filtered fluid in reverse direction through at least a portion of said filter means to clean the latter, said means comprising a cylinder, a piston slidably mounted in said cylinder, said piston having one surface thereof exposed to the fluid in said chamber, means to reciprocate said piston in said cylinder whereby when said surface of the piston exposed to the fluid in said chamber is moved toward the latter it will force at least a portion of such fluid in said chamber in reverse direction through at least a portion of said filter means, an impurity collecting chamber comprising a casing having an inlet port in communication with the casing of said filter and through which said impurities may flow, said collecting chamber casing having a cylinder therein, a piston slidably mounted in said cylinder and spring urged to its uppermost position, a porous bag in said chamber encompassing said cylinder, said inlet port being in communication with the interior of said bag, said chamber having an outlet at the lower end thereof, and means periodically to force fluid under pressure into said chamber to react against said piston to move the latter downwardly to force fluid from said chamber through said outlet, the impurities being restrained by said bag.

References Cited by the Examiner

UNITED STATES PATENTS

| 582,399 | 5/1897 | Stifel | 210—108 |
| 582,402 | 5/1897 | Stifel | 210—108 |
| 1,026,876 | 5/1912 | McLearn | 100—127 |
| 2,035,592 | 3/1936 | Christensen | 210—333 X |
| 2,854,140 | 9/1958 | Muller | 210—333 X |
| 2,902,158 | 9/1959 | Muller | 210—333 X |
| 2,909,285 | 10/1959 | Besler | 210—333 X |

FOREIGN PATENTS

| 1,150,381 | 8/1957 | France. |
| 81,076 | 5/1919 | Switzerland. |
| 198,700 | 12/1938 | Switzerland. |

REUBEN FRIEDMAN, *Primary Examiner.*

D. M. RIESS, *Assistant Examiner.*